United States Patent [19]

Yoshimura et al.

[11] Patent Number: 4,777,413

[45] Date of Patent: Oct. 11, 1988

[54] TAPE SPEED CONTROL DEVICE

[75] Inventors: Ryuichiro Yoshimura; Shinsuke Nishimura, both of Saitama, Japan

[73] Assignee: Pioneer Electronic Corporation, Tokyo, Japan

[21] Appl. No.: 98,827

[22] Filed: Sep. 21, 1987

[30] Foreign Application Priority Data

Sep. 19, 1986 [JP] Japan .......................... 61-142646[U]
Sep. 20, 1986 [JP] Japan .......................... 61-144365[U]

[51] Int. Cl.$^4$ .......................................... B65H 59/38
[52] U.S. Cl. .................................... 318/7; 242/75.51
[58] Field of Search .................... 318/6, 7; 360/70, 71, 360/73, 69; 242/75.44, 75.45, 75.47, 75.5, 75.51

[56] References Cited

U.S. PATENT DOCUMENTS

| | | | |
|---|---|---|---|
| 3,821,467 | 6/1974 | Iketaki et al. | 360/70 |
| 4,160,295 | 7/1979 | Sakamoto | 318/7 |
| 4,341,363 | 7/1982 | Inatome | 360/73 X |
| 4,417,287 | 11/1983 | Ishikura | 360/71 |
| 4,426,668 | 1/1984 | Itoh | 360/73 |
| 4,521,815 | 6/1985 | Tokuyama | 360/70 X |
| 4,626,936 | 12/1986 | Yoshino | 360/70 |
| 4,688,115 | 8/1987 | Takahashi et al. | 360/70 |

Primary Examiner—Bentsu Ro
Attorney, Agent, or Firm—Sugrue, Mion, Zinn, Macpeak, and Seas

[57] ABSTRACT

The tape speed control apparatus according to the present invention is provided with drum period detecting means which detects the speed of the rotary drum by detecting pulses (SWP) for switching the heads of the rotary drum, speed setting means for generating speed data for the rotary drum, the speed data being set from outside, and comparator means for comparing the speed of the rotary drum as set by the speed setting means with the speed of the rotary drum as detected by the drum period detecting means, data on the difference between the set speed and the speed of the rotary drum being supplied to a reel servo, so that the travel speed of the magnetic tape is controlled and kept constant thereby.

2 Claims, 3 Drawing Sheets

4,777,413

TAPE SPEED CONTROL DEVICE

BACKGROUND OF THE INVENTION

The present invention relates to a tape speed control device for controlling the travel speed of a magnetic tape, particularly the travel speed thereof at the time of execution of a high-speed search made in a magnetic recording-playback apparatus of the type recording audio-modulated digital signals on a magnetic tape using rotary heads.

There is known in the art a magnetic recording-playback apparatus known as an R-DAT (Rotary Head Type Digital Audio Tape Recorder) which records PCM (Pulse Code Moderation) signals on a magnetic tape using helical scanning type rotary heads and which plays back the audio signals by reading out the digital data thus recorded from the magnetic tape.

In the high speed search mode of the R-DAT, the travel speed of the magnetic tape is set about 100 to 200 times higher than that during normal recording and playback, to obtain the desired data reproduction point quickly. During the high speed search, the rotary drum carrying the heads rotates at a speed matching the speed of the magnetic tape in order to retrieve the data recorded thereon.

The speed of the rotary drum is controlled by a drum servo at the time of high-speed search, as in the case of normal playback, to read the subcode data identifying the data recorded on the magnetic tape and to equalize the frequency of the signal played back at the time of retrieval to that set during normal playback, whereas the speed of the tape reel is controlled by a reel servo and is maintained at a fixed level.

In order to keep the tape speed constant during high-speed operation in the FF or REW mode, a known arrangement uses the value obtained through computation from the rotational periods of both supply and winding reel racks for controlling purposes. However, a problem remains in that the tape speed as determined by the tape length (30, 60, 90, 120 minutes, etc.) still remains variable. Since the linear speed of the magnetic tape varies with the length of the magnetic tape wound on the hub of the reel even if the speed of the reel is kept constant, the drum servo has to be solely relied upon for servo control.

SUMMARY OF THE INVENTION

An object of the invention is to provide a tape speed control device wherein a reel servo of the sort described above is controlled in such a manner that the travel speed of the magnetic tape is kept constant to reduce the work load on the drum servo at the time of a high-speed search mode in such an R-DAT.

In order to accomplish the aforesaid object, the tape speed control apparatus according to the present invention is provided with drum period detecting means which detects the speed of the rotary drum by detecting pulses (SWP) for switching the heads of the rotary drum, speed setting means for generating speed data for the rotary drum, the speed data being set from outside, and comparator means for comparing the speed of the rotary drum as set by the speed setting means with the speed of the rotary drum as detected by the drum period detecting means, data on the difference between the set speed and the speed of the rotary drum being supplied to a reel servo, so that the travel speed of the magnetic tape is controlled and kept constant thereby.

It is a further object of the invention to provide a magnetic recording-playback apparatus wherein the tape speed is prevented from fluctuating due to tape length by feeding back data obtained by detecting the rotary speed of the rotary drum to the reel servo, this data being obtained when the tape speed is controlled to become constant by a value computed using the sum of the periods of the supply and winding reels or that of the square of the periods thereof. Therefore, the magnetic recording-playback apparatus of the present invention comprises: supply reel period detecting means for detecting the rotational period of a supply reel; winding reel period detecting means for detecting the rotational period of a winding reel; means for computing an arithmetic function of the supply and winding reel periods; reel motor speed control means for controlling the speed of a reel motor in such a manner so as to obtain a constant tape speed in response to an output of the computing means; drum period detecting means for detecting the speed of a head-carrying rotary drum; speed setting means for generating a speed set for the drum; and comparing means for comparing an output of the drum period detecting means and an output of the speed setting means when the tape speed becomes constant, and for feeding back the comparison to the reel motor speed control means, whereby the tape speed as controlled by tape length during high-speed operation is prevented from fluctuating.

According to this latter embodiment of the present invention, the tape speed is controlled and made constant by the reel servo using the results obtained through computations on the rotational periods of the supply and winding reels, and the speed control output based on the r.p.m. of the drum when the tape speed becomes constant is fed back to the reel servo.

DETAILED DESCRIPTION OF THE PREFERRED EMBODIMENT

Figure 2:
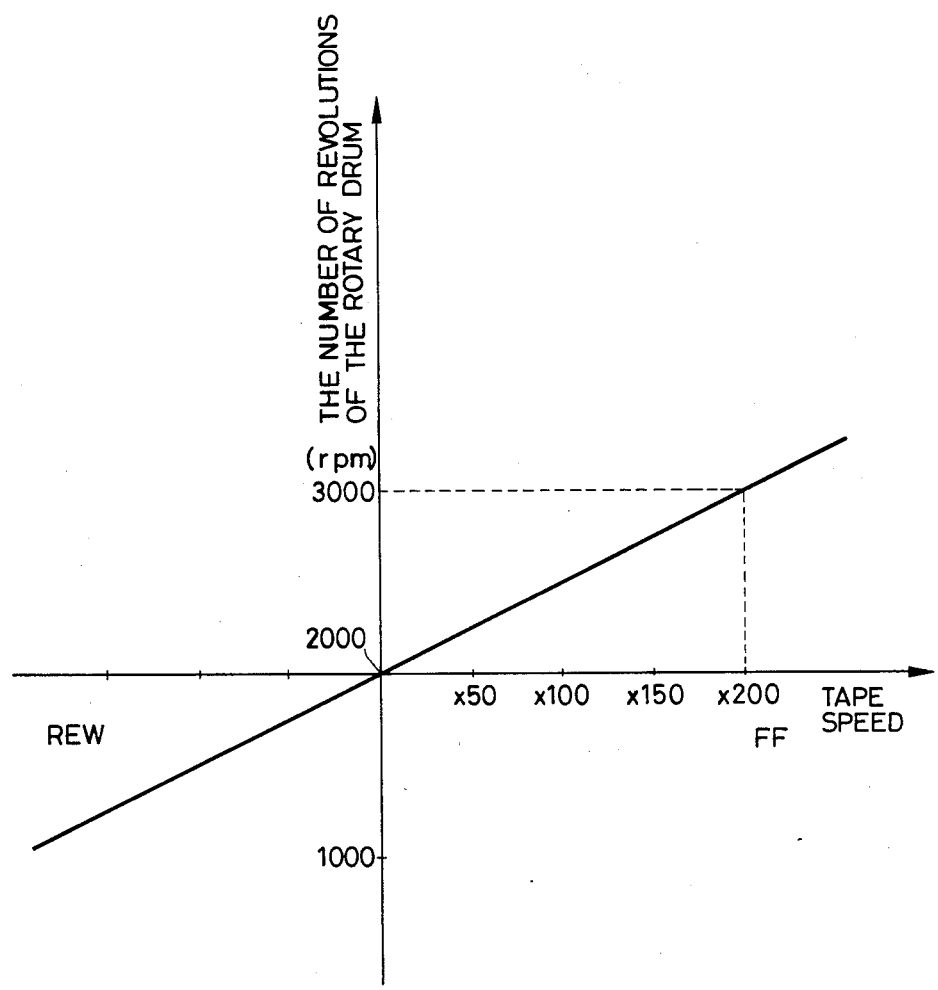
FIG. 2 is a graph representing the relationship between the travel speed of a magnetic tape and the r.p.m. of a rotary drum.

FIG. 2 is a graph representing the relationship between the travel speed of a magnetic tape and the speed of a rotary drum following the travel of the magnetic tape under servo control. As shown in FIG. 2, there is established a proportional relationship between the travel speed of the magnetic tape and the r.p.m. of the rotary drum. Provided the speed of the rotary drum is controlled to become a constant, i.e., the reel survo is controlled so that the speed of the rotary drum will not deviate from the set speed thereof, the travel speed of the magnetic tape can be kept constant.

Figure 1:
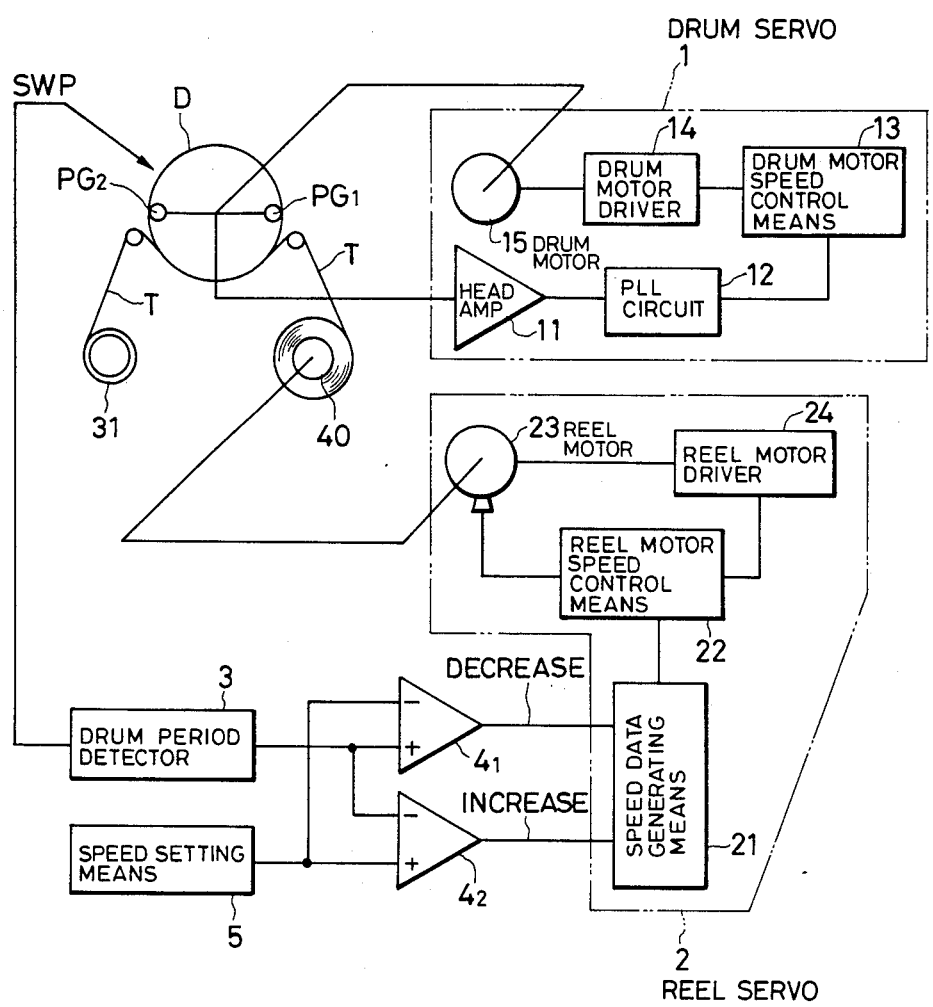
FIG. 1 is a block diagram of a rotary drum and reel drive and control means for an R-DAT according to a first embodiment of the present invention.

FIG. 1 is a block diagram of the rotary drum and reel driving means of an R-DAT to which the present invention is adapted and, referring to FIG. 1, an embodiment of the present invention will be described.

A drum servo 1 is designed to control the speed of drum motor 15. A head amplifier 11 extracts a clock signal from the signal read out from tape T by a head (not shown) mounted on rotary drum The clock signal hus extracted is supplied via a PLL (phase locked loop) circuit 12 to drum motor speed control means 13 as a stabilized clock signal. A drum motor driver 14 is controlled by the frequency of the clock received by the drum motor speed control means 13. Rotary speed of the drum motor 15 is controlled by controlling the period of the clock signal to a constant value. Drum speed is kept constant by controlling the tape speed to a constant value.

On the other hand, a reel servo 2 controls the speed of the reel motor 23 through the steps of having speed data generating means 21 supply speed data designating the speed of a reel to reel motor speed control means 22, and controlling a reel motor driver 24 by letting the reel motor speed control means 22 match the frequency of a pulse for rotating the reel motor 23 with the value of the speed data supplied by the speed data generating means 21.

Drum period detecting means 3 is used to detect the speed of the rotary drum by detecting head switching pulses (SWP) generated by two pulse generators $PG_1$, $PG_2$ mounted on the rotary drum D, and applies an output indicating that speed to the + terminal of a first comparator $4_1$ and the − erminal of a second comparator $4_2$.

Speed setting means 5 is employed to set the speed (e.g., 2,000 rpm for the rotary drum) from outside and to apply an output indicating the set speed to the − terminal of the first comparator $4_1$ and the + terminal of the second comparator $4_2$.

The first and second comparators $4_1$, $4_2$ compare the speed of the rotary drum with the set speed and supply the results of comparison to the speed data generating means 21. Control is provided in such a manner as to have the reel servo update the speed of reel 40 under servo control.

When the travel speed of the magnetic tape is to be 200 times as high as that during normal operation, for instance, the r.p.m. of the rotary drum following the travel speed thereof is, as shown in FIG. 2, 3,000 r.p.m. The 3,000 r.p.m. value is set in the speed setting means 5 beforehand when high-speed search is to be carried out at a speed 200 times as high as a normal speed.

Assuming that the reel 40 and the rotary drum D are driven at a speed 200 times as high as that during normal operation during high-speed search, the magnetic tape T is rapidly wound up on the hub of the reel 40, for instance, and, as the travel speed of the magnetic tape T increases, the speed of the rotary drum following the travel speed thereof also increases. Accordingly, the outputs applied to the first and second comparators via detector 3 increase in proportion to the decrease in the period (increase in the frequency) of the head switching pulse (SWP) supplied to the drum period detector 3, and, when the output of the detector 3 exceeds the output of the speed setting means 5 where a speed of, e.g., 3,000 r.p.m. has been set, the first comparator $4_1$ detects the excess and instructs the speed data generating means 21 to reduce the speed.

In the reel servo 2, the speed data generating means 21 accordingly updates the speed data supplied to the reel motor speed control means 22 from the means 21, to keep the travel speed of the magnetic tape T constant.

Moreover, when the travel speed of the magnetic tape T decreases, the comparator $4_2$ detects the decrease and instructs the reel servo 2 to increase the reel speed to keep the travel speed of the magnetic tape constant.

The magnetic tape speed control as described above is applicable to the high-speed search function in both FF and REW modes.

The travel speed of the magnetic tape is thus controlled so that the speed of the rotary drum may be kept constant during the high-speed search mode of the R-DAT. Since the travel speed of the magnetic tape is thus kept constant, the work load on the drum servo is reduced.

Figure 3:
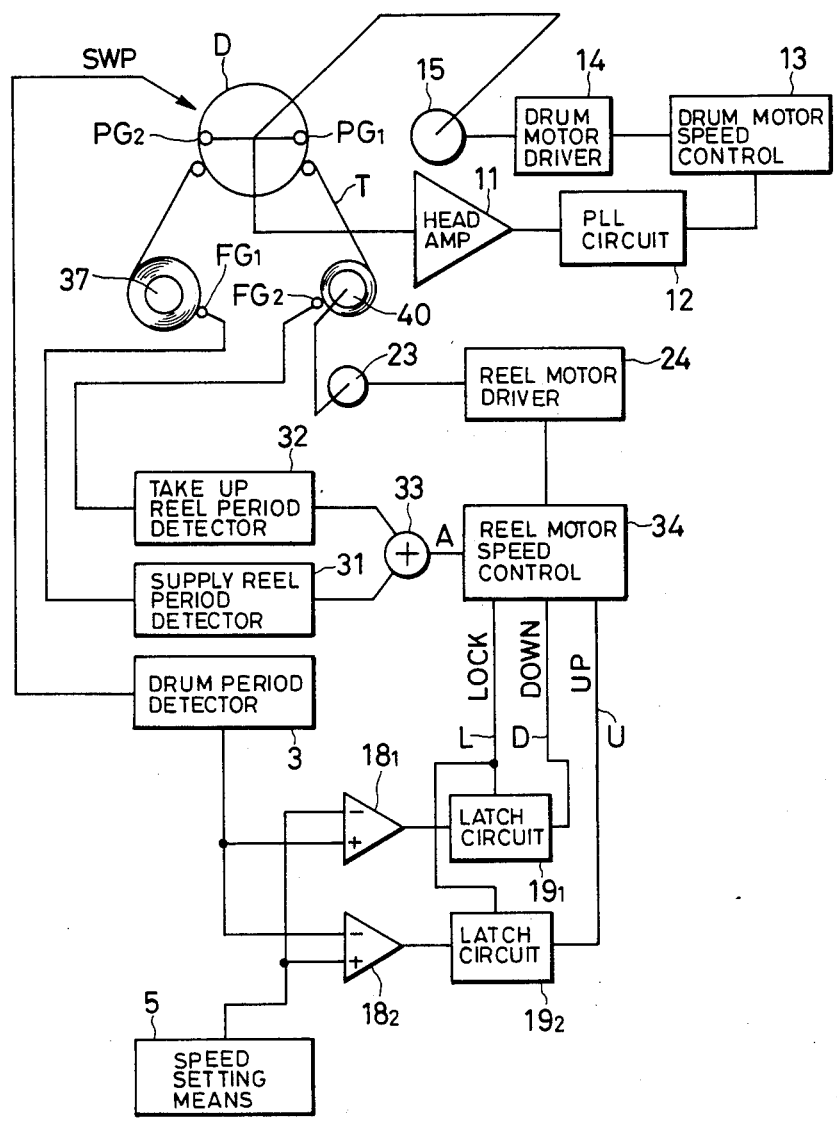
FIG. 3 is a block diagram of a speed control device according to a second embodiment of the invention.

FIG. 3 is a block diagram of another embodiment of the invention.

As in the FIG. 1 arrangement, the R-DAT includes carrying two heads arranged 180° apart; pulse generators $PG_1$, $PG_2$; a magnetic tape T; a supply reel 37; and a winding reel 40. The apparatus further includes frequency generators $FG_1$, $FG_2$ for respectively detecting rotation of the supply and winding reels 37, 40.

The arrangement also includes a head amplifier 11 for amplifying the signal read by the head; a PLL circuit 12 for extracting a clock signal from the output of the head amplifier; drum motor speed control means 13 for controlling the speed of drum motor 15 according to the clock signal from the PLL circuit 12; and a drum motor driver 14 for driving and controlling the drum motor 15 according to the speed control output from the drum motor speed control means 13. The head amplifier 11, the PLL circuit 12, the drum motor speed control means 13 and the drum motor driver 14 constitute a drum servo for controlling the speed of the drum motor 15.

The arrangement further includes drum period detecting means 3 for determining the speed of the rotary drum D by means of head switching pulses (SWPs) from the pulse generators $PG_1$, $PG_2$; supply reel period detecting means 31 for detecting the rotational period of the supply reel 37 from the output of the frequency generator $FG_1$; winding reel period detecting means 32 for detecting the rotational period of the winding reel 40 from the output of the frequency generator $FG_2$; an adder 33 for adding the output from the supply reel period detecting means 31 and that from the winding reel period detecting means 32; reel motor speed control means 34 for controlling the speed of the reel motor 23 by means of the output of the adder 33 and control outputs from latch circuits $19_1$ and $19_2$ described below; and a reel motor driver 24 for driving and controlling the reel motor 23 according to the speed control output from the reel motor speed control means 34. The supply reel period detecting means 31, the winding reel period detecting means 32, the adder 33, the reel motor speed control means 34 and the reel motor driver 24 constitute a reel servo for controlling the speed of the reel motor 23.

The arrangement further includes speed setting means 5 employed to set from outside data concerning the speed at which the drum should rotate with following up the tape speed and to output a signal indicating the set speed; comparators $18_1$, $18_2$ for comparing the speed of the rotary drum D (as detected by drum period detecting means 3) with the high-speed operation set speed value received from the speed setting means 5; and latch circuits $19_1$, $19_2$ for issuing instructions for controlling the speed of the reel to the reel motor speed control means 34, to control the speed of the reel motor 23 during high-speed operation according to the outputs of the comparators $18_1$, $18_2$.

The operation of the magnetic recording-playback apparatus of this embodiment will now be described.

The signals from the magnetic tape T by the heads mounted on the rotary drum D are amplified by the head amplifier 11 and are supplied to the PLL circuit 12 where a clock signal is extracted. The clock signal thus extracted and stabilized in the PLL circuit 12 is supplied to the drum motor speed control means 13. The drum motor driver 14 is controlled by the clock supplied from the drum motor speed control means 13. The speed of the drum motor 15 is thus controllable.

The rotational period of the supply reel obtained from the supply reel period detecting means 31 by means of the output from the frequency generator $FG_1$ and the rotational period of the winding reel obtained from the winding reel period detecting means 32 by means of the output from the frequency generator $FG_2$ are added by the element 33 and a speed control signal from the reel motor speed control means 34 is supplied via the reel motor driver 24 to the reel motor 23, whereby the speed of the reel motor 23 is controlled.

The drum period detecting means 3 detects the head switching pulses (SWPs) generated by the pulse generators $PG_1$, $PG_2$ to detect the speed of the rotary drum D and supplies an output indicating the speed thus obtained to the + input terminal of the comparator $18_1$ and the − input terminal of the comparator $18_2$. The speed setting means 5 generates a drum speed value set in compliance with the desired tape speed and supplies an output representing the set speed to the −input terminal of the comparator $18_1$ and the + input terminal of the comparator $18_2$. The comparators $18_1$, $18_2$ are used to compare the set speed with the speed of the rotary drum D. The comparative outputs are supplied to the latch circuits $19_1$, $19_2$, respectively. The outputs from the latch circuits $19_1$, $19_2$ are supplied to the reel motor speed control means 34. Based on the data obtained by detecting the r.p.m. of the drum using the drum period detecting means 3 when the tape speed is made constant by the reel servo during high-speed operation, the outputs of the latch circuits $19_1$, $19_2$ are fed back to the reel motor speed control means 34 in such a manner as to conform the tape speed to that required. In particular, an "up" instruction is applied to speed control means 34 to set the reel speed to a higher value when the speed set by unit 5 exceeds the speed detected by drum speed detector 3. Similarly, a "down" instruction is applied when the detected drum speed exceeds the value set by speed setting unit 5.

Now, the operation of the apparatus of this embodiment will be described in greater detail.

The computing means 33 outputs signal representing the value A of the sum of the periods of the supply and winding reels 37 and 40 or the sum of the square of the periods thereof. The signal of the value A is inputted into the reel motor speed control means 34. In the control means 34, the value A is compared with a reference value B set in the control means 34. When the value A is not equal to the reference value B, the reel motor speed control means 34 controls, via the reel motor driver 24, the reel motor 23 so that the value A will become equal to and fixed at the reference value B, to thereby make the tape speed constant and fixed at a value corresponding to the value B. When the value A is made equal to and fixed at the reference value B, the tape speed is made constant and fixed at a value corresponding to the value B.

When the value A is made equal to and fixed at the reference value B, the control means 34 outputs a lock signal L to the latch circuits $19_1$ and $19_2$. Upon receiving the lock signals L, the latch circuits $19_1$ and $19_2$ start transmitting signals from the comparators $18_1$ and $18_2$ to the reel motor control means 34. (The latch circuits $19_1$ and $19_2$ do not operate to transmit signals from the comparators $18_1$ and $18_2$, without receiving the lock signal L from the control means 34.)

On the other hand, the drum period detector 3 outputs a signal representing a value of the drum period, which are inputted into the comparators $18_1$ and $18_2$. The drum period set value generated from the speed setting means 5 is also inputted into the comparator means $18_1$ and $18_2$. After the latch circuits $19_1$ and $19_2$ receive lock signals L from the control means 34, since the latch circuits $19_1$ and $19_2$ start transmitting signals from the comparators $18_1$ and $18_2$ to the control means 34, the latch circuits $19_1$ and $19_2$ operate as follows:

In the case where the output of the detector 3 is lower than the output of the unit 5, an "up" signal U is generated at the comparing means $18_2$ and transmitted through the latch circuit $19_2$ to the control means 34, so that the reference value B in the control means 34 is updated to be increased. On the other hand, if the output of the detector 3 is higher than the output of the unit 5, a "down" signal D' is gnerated at the comparing means $18_1$ and transmitted through the latch circuit $19_1$ to the control means 34, as a result of which the reference value B in the control means 34 is updated to be decreased.

After the reference value B is changed, the reel motor speed control means 34 again starts controlling of the speed of the reel motor 23 so as to make the value A equal to the changed value B.

Through the steps described above, the speed of the reel motor can be controlled so that the tape speed will be constant. Furthermore, as described above, in the present invention, the reference value B is updated or changed in accordance with the drum period detected by the unit 3. Therefore, since the drum period detected by the detecting means 3 is changed in accordance with the length of the tape T used, the reference value B in the control means 34 can be set in compliance with the tape length. As a result, it becomes possible to make the tape speed constant at a suitable value corresponding to the tape length.

As set forth above, the tape speed is controlled so that the sum of the rotational period of the supply reel and the rotational period of the winding reel is made constant, and a reel speed control output based on data obtained by detecting the r.p.m. of the drum when the tape speed is made constant is fed back to the reel servo. Accordingly, the tape speed is controlled in dependence upon the tape length and is prevented from fluctuating.

What is claimed is:

1. A tape speed control device for controlling the relative speeds of a rotary drum and a magnetic tape, comprising;

a drum servo for controlling the speed of said rotary drum in accordance with the travel speed of said magnetic tape as determined by reading signals recorded on said magnetic tape;

a reel servo for controlling the speed of tape reels used to transport said magnetic tape;

drum period detecting means for detecting the speed of said rotary drum and producing a value corresponding to the speed thus detected;

speed setting means for generating a value corresponding to the desired speed of said rotary drum; and comparing means for producing the difference between the actual speed of said rotary drum and the value generated by said speed setting means;

wherein said reel servo is controlled in accordance with a signal corresponding to said difference.

2. A magnetic recording-playback apparatus, comprising;

supply reel period detecting means for detecting the rotational period of a supply reel;

winding reel period detecting means for detecting the rotational period of a winding reel;

means for computing an arithmetic function of said supply and winding reel periods;

reel motor speed control means for controlling the speed of a reel motor in such a manner so as to obtain a constant tape speed in response to an output of said computing means;

drum period detecting means for detecting the speed of a head-carrying rotary drum;

speed setting means for generating a speed setting for said drum; and comparing means for comparing an output of said drum period detecting means and an output of said speed setting means when said tape speed becomes constant, and for feeding back the comparison to said reel motor speed control means, whereby the tape speed as controlled by tape length during high-speed operation is prevented from fluctuating.

* * * * *